United States Patent
Chang

(10) Patent No.: US 6,252,986 B1
(45) Date of Patent: Jun. 26, 2001

(54) LOCATING AN IMAGE OF AN OBJECT HAVING A CONCENTRIC PROFILE

(75) Inventor: Yian Leng Chang, Nashua, NH (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/216,071

(22) Filed: Dec. 18, 1998

Related U.S. Application Data

(60) Provisional application No. 60/080,689, filed on Apr. 3, 1998.

(51) Int. Cl.[7] .................................................. G06K 9/46
(52) U.S. Cl. ............................................................ 382/203
(58) Field of Search .................................... 382/203, 204, 382/205, 206, 103, 108, 287, 288, 291, 303, 226; 219/121.65, 121.66, 121.84, 121.85

(56) References Cited

U.S. PATENT DOCUMENTS

| | | |
|---|---|---|
| 4,980,971 | 1/1991 | Bartschat et al. . |
| 5,060,276 | 10/1991 | Morris et al. . |
| 5,113,565 | 5/1992 | Cipolla et al. . |
| 5,195,392 * | 3/1993 | Moore et al. ........................ 73/866.5 |
| 5,226,095 | 7/1993 | Okumura et al. . |
| 5,268,999 | 12/1993 | Yokoyama . |
| 5,343,028 | 8/1994 | Figarella et al. . |
| 5,371,690 | 12/1994 | Engel et al. . |
| 5,471,541 | 11/1995 | Burtnyk et al. . |
| 5,495,537 | 2/1996 | Bedrosian et al. . |
| 5,497,451 | 3/1996 | Holmes . |
| 5,500,906 | 3/1996 | Picard et al. . |
| 5,545,887 | 8/1996 | Smith et al. . |
| 5,602,937 | 2/1997 | Bedrosian et al. . |
| 5,621,807 | 4/1997 | Eibert et al. . |
| 5,625,715 | 4/1997 | Trew et al. . |
| 5,627,912 | 5/1997 | Matsumoto . |
| 5,627,915 | 5/1997 | Rosser et al. . |
| 5,641,909 * | 6/1997 | Kiefer et al. ........................... 73/623 |
| 5,662,705 * | 9/1997 | Love et al. ............................... 623/2 |
| 5,663,809 | 9/1997 | Miyaza et al. . |
| 5,828,769 | 10/1998 | Burns . |
| 5,837,960 * | 11/1998 | Lewis et al. ..................... 219/121.63 |
| 5,845,288 | 12/1998 | Syeda-Mahmood . |
| 5,850,469 | 12/1998 | Martin et al. . |
| 5,974,169 | 10/1999 | Bachelder . |
| 5,997,594 * | 12/1999 | Edlund et al. ............................ 48/76 |
| 6,023,530 * | 2/2000 | Wilson ................................. 382/219 |

OTHER PUBLICATIONS

Cognex Corporation, "Chapter 5 Fiducial Finder", *Cognex 4000/5000 SMD Placement Guidance Package User's Manual*, pp. 179–223, Release 3.2 590–0139, Natick, MA, USA, 1996.

(List continued on next page.)

*Primary Examiner*—Andrew W. Johns
*Assistant Examiner*—Seyed H. Azarian
(74) *Attorney, Agent, or Firm*—Russ Weinzimmer

(57) ABSTRACT

A method is provided for finding an image of an object having a concentric profile, wherein the concentric profile has an inner profile and an outer profile, and wherein the inner profile is in concentric relationship with the outer profile. In another general aspect of the invention, a method is provided for finding an image of an object having a concentric profile, the concentric profile having a plurality of constituent profiles, where each profiles of the plurality of constituent profiles scales independently in a fine search phase. The methods of the invention can find circular profiles of a nozzle that scale non-uniformly as well as that scale uniformly, and therefore can be used to find one or more rings or profiles of the image of a nozzle. Further, the methods of the invention can provide superior accuracy regarding the position of the nozzle for many applications. Moreover, certain aspects of the relationship between the inner and outer profiles of the image of the nozzle, such as a bent nozzle condition, can be effectively inspected by the methods of the invention.

6 Claims, 5 Drawing Sheets

OTHER PUBLICATIONS

Cognex Corporation, "Chapter 7 Rectilinear Device Inspection", *Cognex 4000/5000 SMD Placement Guidance Package User's Manual*, pp. 269–310, Release 3.2 590–0139, Natick, MA, USA, 1996.

Hoogs et al., "Model–Based Learning of Segmentations", IEEE, pp. 494–499, 1996.

Medina–Mora, R., "An Incremental Programming Enviroment", *IEEE Transactions on Software Engineering*, Sep. 1981, pp. 472–482, vol. SE–7, No. 5, USA.

Newman et al., "3D CAD–Based Inspection I: Coarse Verification", IEEE, pp. 49–52, 1992.

Ullman, S., "Aligning pictorial descriptions: An approach to object recognition, I: Approached to Object Recognition", reprinted from *Cognition*, pp. 201–214, vol. 32, No. 3, Cambridge, MA, USA, Aug. 1989.

* cited by examiner

A Front-Lit Nozzle

A Back-Lit Nozzle

Example of Sub-model table and model storage for a front light nozzle model

Example of Sub-model table and model storage for a back light nozzle model

LOCATING AN IMAGE OF AN OBJECT HAVING A CONCENTRIC PROFILE

CROSS-REFERENCE TO RELATED APPLICATIONS

This application claims the benefit of U.S. Provisional Application Ser. No. 60/080,689, filed Apr. 3, 1998.

FIELD OF THE INVENTION

This invention relates to machine vision, and particularly to machine vision systems specialized for finding a particular class of objects in an image.

BACKGROUND OF THE INVENTION

Many machine vision systems use a model of an object for locating and/or inspecting objects in an image.

In the field of semiconductor device manufacturing, a vacuum nozzle is used to pick up semiconductor chips. In manufacturing facilities using machine vision, it is sometimes necessary to inspect the nozzle to ensure that the nozzle will function reliably. To inspect the nozzle, an image of the nozzle is acquired by the machine vision system, and the image is searched with a model of the nozzle to find, and then inspect the nozzle.

It is known to use the Generalized Hough Transform (GHT), specialized to find circles, to create a GHT circular model of the nozzle, given the diameter of the nozzle. However, this approach can only find circular profiles of the nozzle that scale uniformly, and is therefore typically only used to find one ring or profile of the image of the nozzle, typically only the outer ring. Further, sometimes this approach does not provide sufficient accuracy regarding the position of the nozzle for some applications. Moreover, certain aspects of the relationship between the inner and outer profiles of the image of the nozzle cannot be inspected at all, such as concentricity, and bent nozzle conditions.

SUMMARY OF THE INVENTION

In a first general aspect of the invention, a method is provided for finding an image of an object having a concentric profile, wherein the concentric profile has an inner profile and an outer profile, and wherein the inner profile is in concentric relationship with the outer profile. The method includes the steps of creating a single model of the object using the inner profile and the outer profile; creating a compound model of the object having an inner sub-model based on the inner profile, and an outer sub-model based on the outer profile; in a coarse search phase, searching for the object using the single model to provide coarse location information; and in a fine search phase, searching for the object using the coarse location information and the compound model to provide fine object location and object scale information.

In a preferred embodiment, the fine object scale information includes: an inner profile diameter and an outer profile diameter. In another preferred embodiment, each sub-model of the compound model is a closed two-vertex curvilinear shape that spans 180 degrees. In other preferred embodiments, each sub-model includes information representing polarity.

In another general aspect of the invention, a method is provided for finding an image of an object having a concentric profile, the concentric profile having a plurality of constituent profiles, wherein the profiles are in concentric relationship with each other. Here, the method includes creating a single model of the object using the plurality of constituent profiles; creating a compound model of the object having a sub-model for each profile of the plurality of constitutent profiles; in a coarse search phase, searching for the object using the single model to provide coarse location information; and in a fine search phase, searching for the object using the coarse location information and the compound model to provide fine object location and object scale information. In a preferred embodiment, each of the profiles of the plurality of constituent profiles scales independently in the fine search phase.

The methods of the invention can find circular profiles of a nozzle that scale non-uniformly as well as that scale uniformly, and is therefore can be used to find one or more rings or profiles of the image of a nozzle. Further, the methods of the invention can provide superior accuracy regarding the position of the nozzle for many applications. Moreover, certain aspects of the relationship between the inner and outer profiles of the image of the nozzle, such as a bent nozzle condition, can be effectively inspected by the methods of the invention.

BRIEF DESCRIPTION OF THE DRAWING

The invention will be more fully understood from the following detailed description, in conjunction with the following figures, wherein.

DETAILED DESCRIPTION OF SOME PREFERRED EMBODIMENTS

Figure 1:
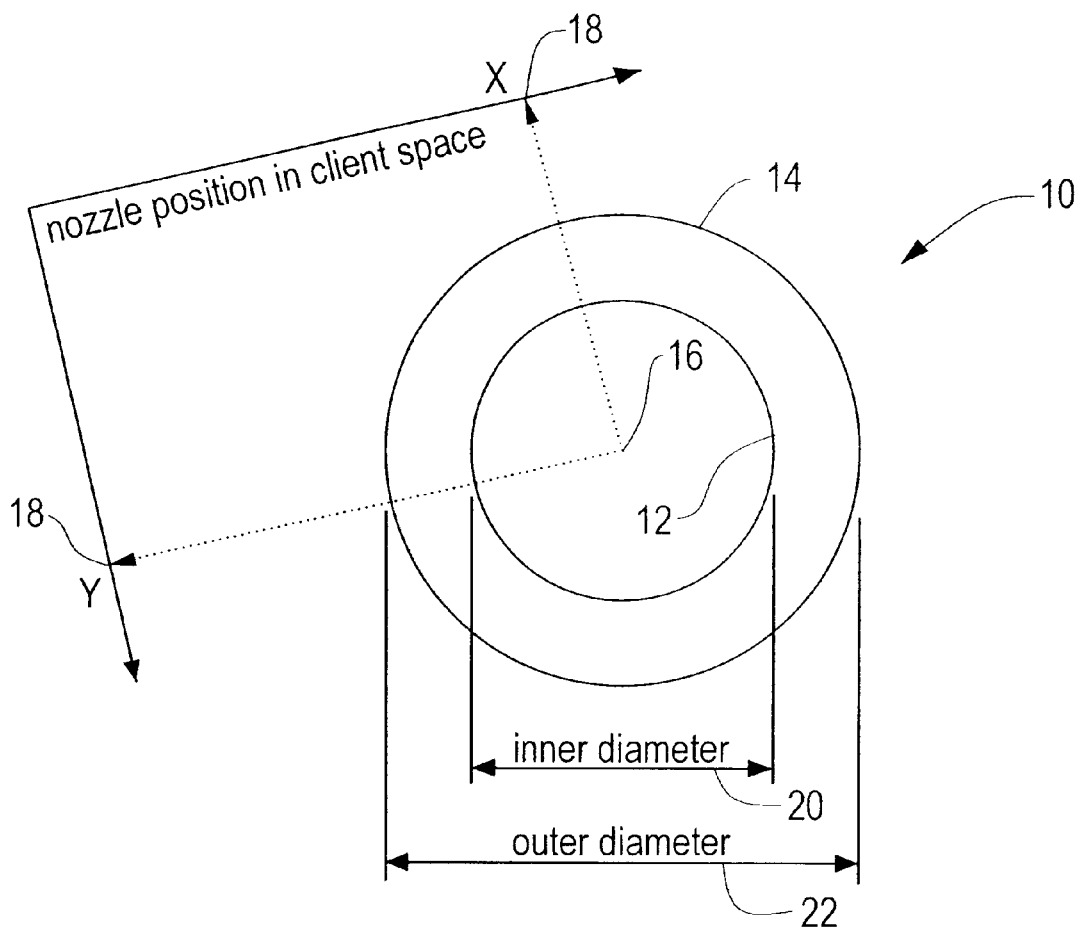
FIG. 1 is an bottom view of a circular nozzle, showing inner and outer diameter, as well as a "client" coordinate system to provide a frame of reference to establish a position of the nozzle.

Referring to FIG. 1, the method of the invention can use a sub-model based search tool, such as the Cognex Sub-Model Search Tool, to locate an image of an object having a concentric profile, such as an image of the bottom of a circular nozzle 10. In such an image, the concentric profile has an inner profile 12 and an outer profile 14, where the inner profile is in concentric relationship 16 with the outer profile. Upon a successful application of the method of the invention, the found nozzle position 18 and measured size of the nozzle, including both the inner diameter measurement 20 and outer diameter measurement 22, are returned to the user.

The invention is not limited to circular concentric profiles. For example, the inner profile can be circular, and the outer profile can be hexagonal, wherein the center of the circle is in concentric relationship with the center of the hexagonal profile. In general, the inner and outer profiles can be of different shapes. Also, both the inner profile and the outer profile can be non-circular. Any regular polygon having a center and 'n' sides can serve as either or both profiles, provided that the inner and outer profiles are in concentric relationship.

Figure 2B:
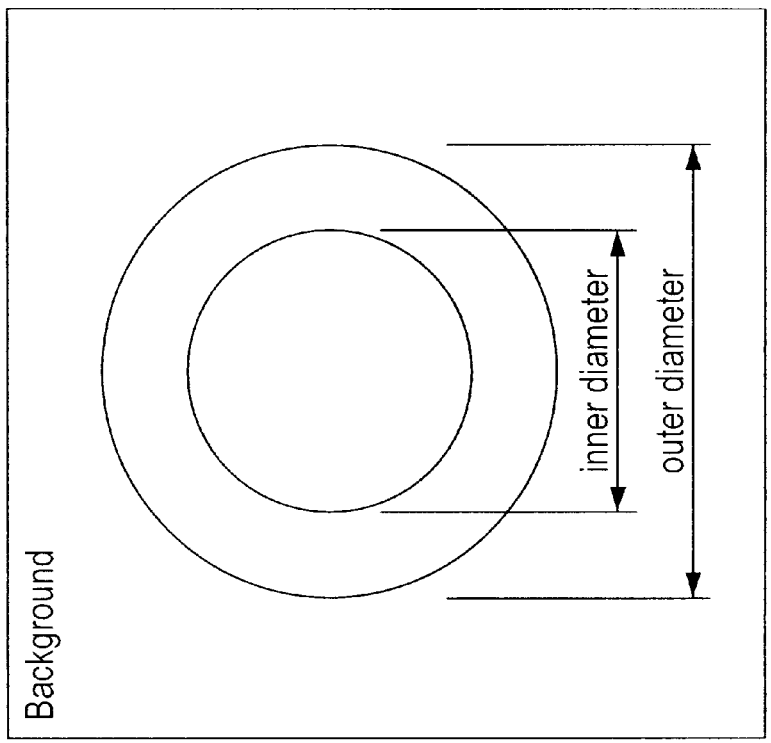
FIG. 2B is a bottom view of a nozzle under "front lit" conditions.
Figure 2A:
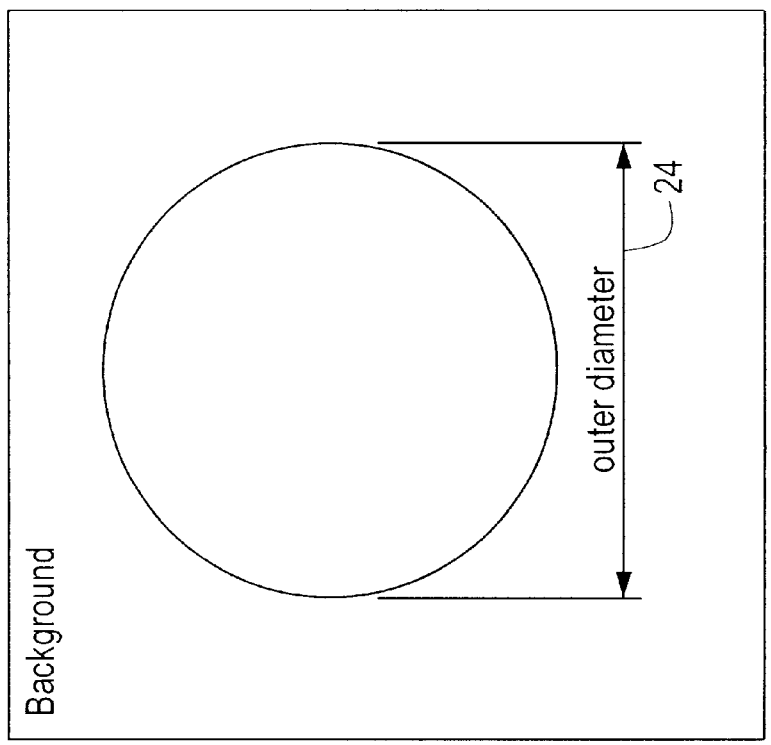
FIG. 2A is a bottom view of a nozzle under "back lit" conditions.

The invention is particularly adapted for use with front-lit images, such as the image in FIG. 2B, and can also be used with back-lit images, such as the image in FIG. 2A, even when there is only one profile, e.g., the outer diameter 24.

The Cognex Sub-Model Search Tool is described in the co-pending patent application entitled "Object Image Search Using Sub-models", U.S. patent application Ser. No. 09/054,968, filed Apr. 3, 1998, herein incorporated by reference. The Cognex Sub-model Search Tool automatically breaks up a geometric model into sub-models, roughly finds the entire model within the image, refines the positions of the sub-models within local image neighborhoods, and fits the refined locations of the sub-models to their positions within the model so as to refine the pose of the model.

Figure 3:
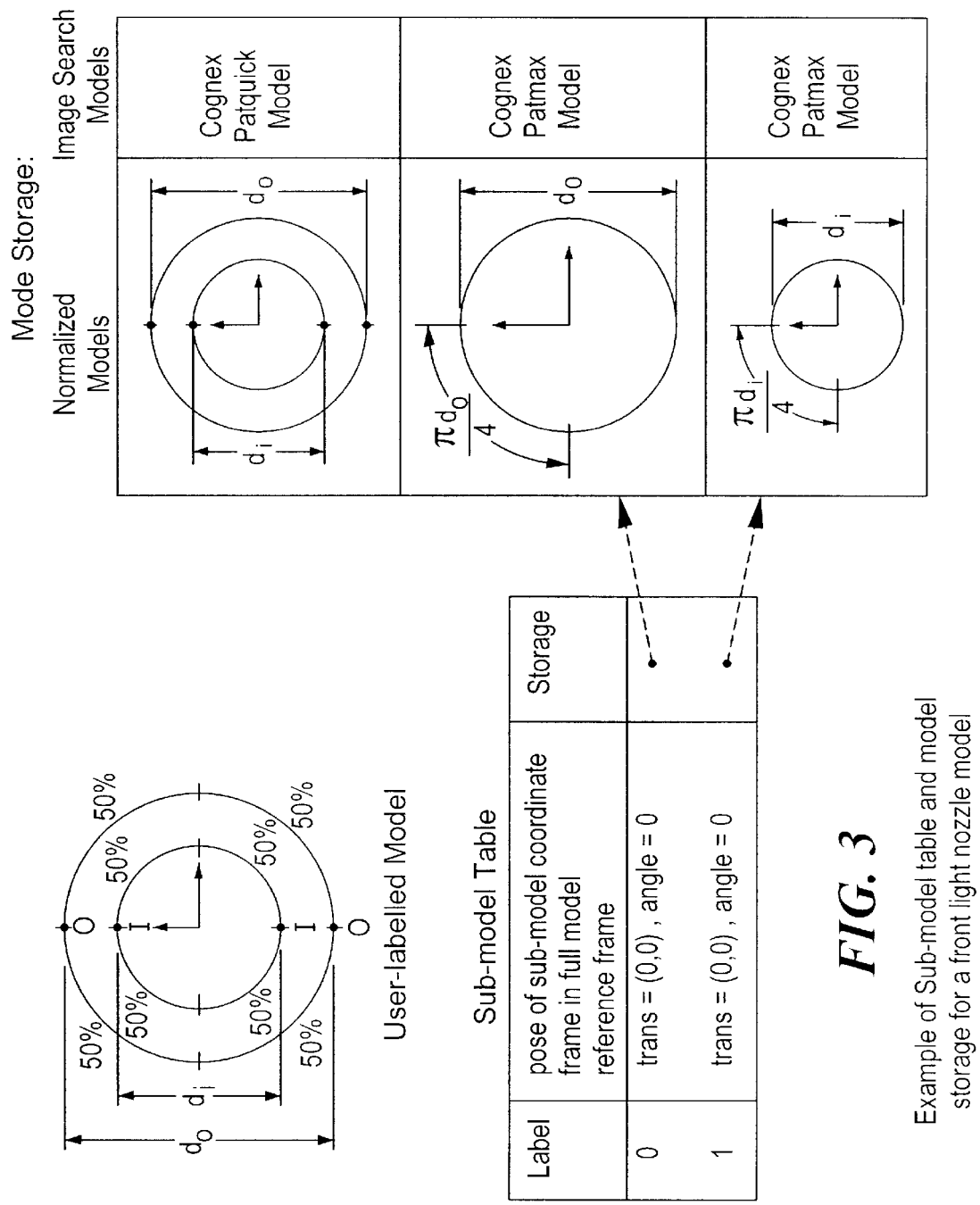
FIG. 3 includes a user-labeled model of a front light bottom view of a nozzle as shown in FIG. 2B, along with the corresponding sub-model table, normalized models, and image search models.
Figure 4:
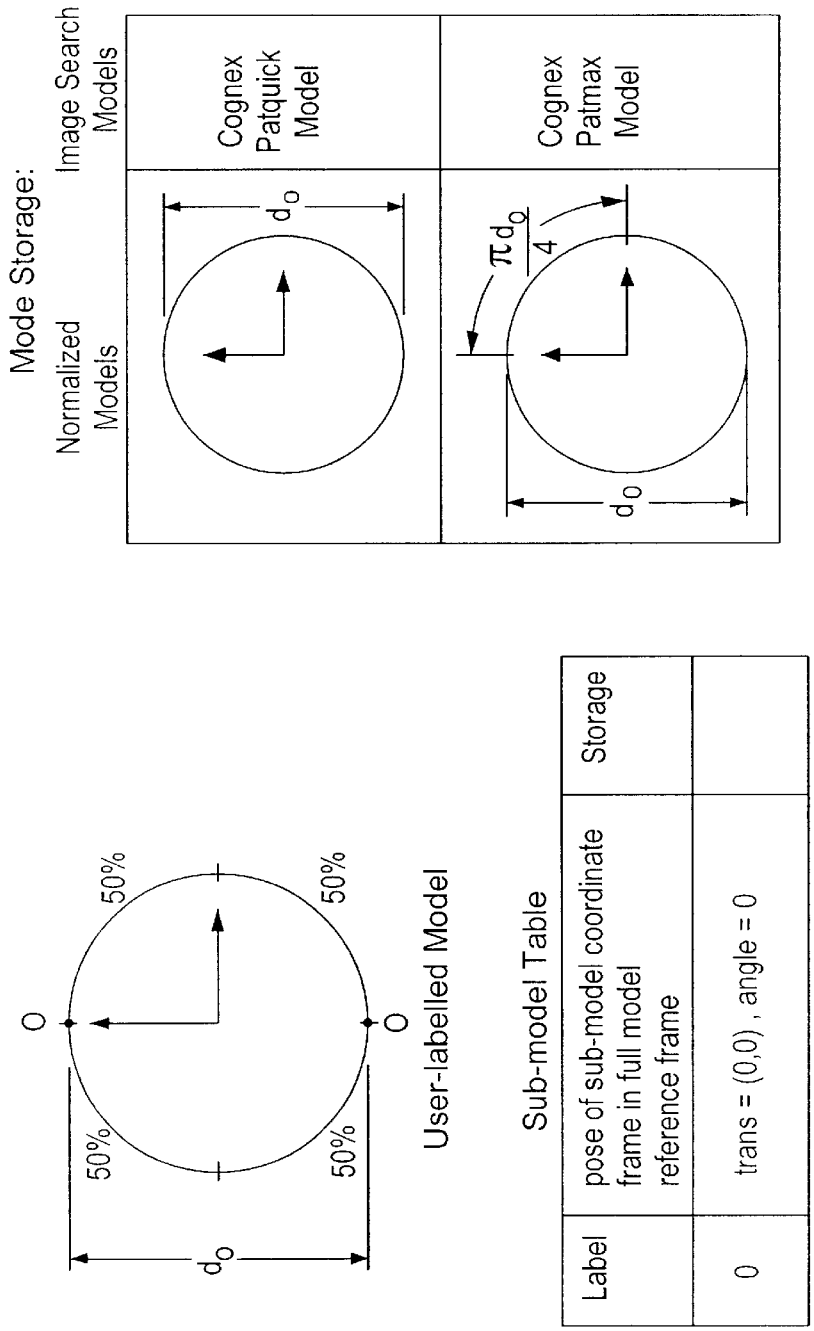
FIG. 4 includes a user-labeled model of a back light bottom view of a nozzle as shown in FIG. 2A, along with the corresponding sub-model table, normalized models, and image search models.
Figure 5:
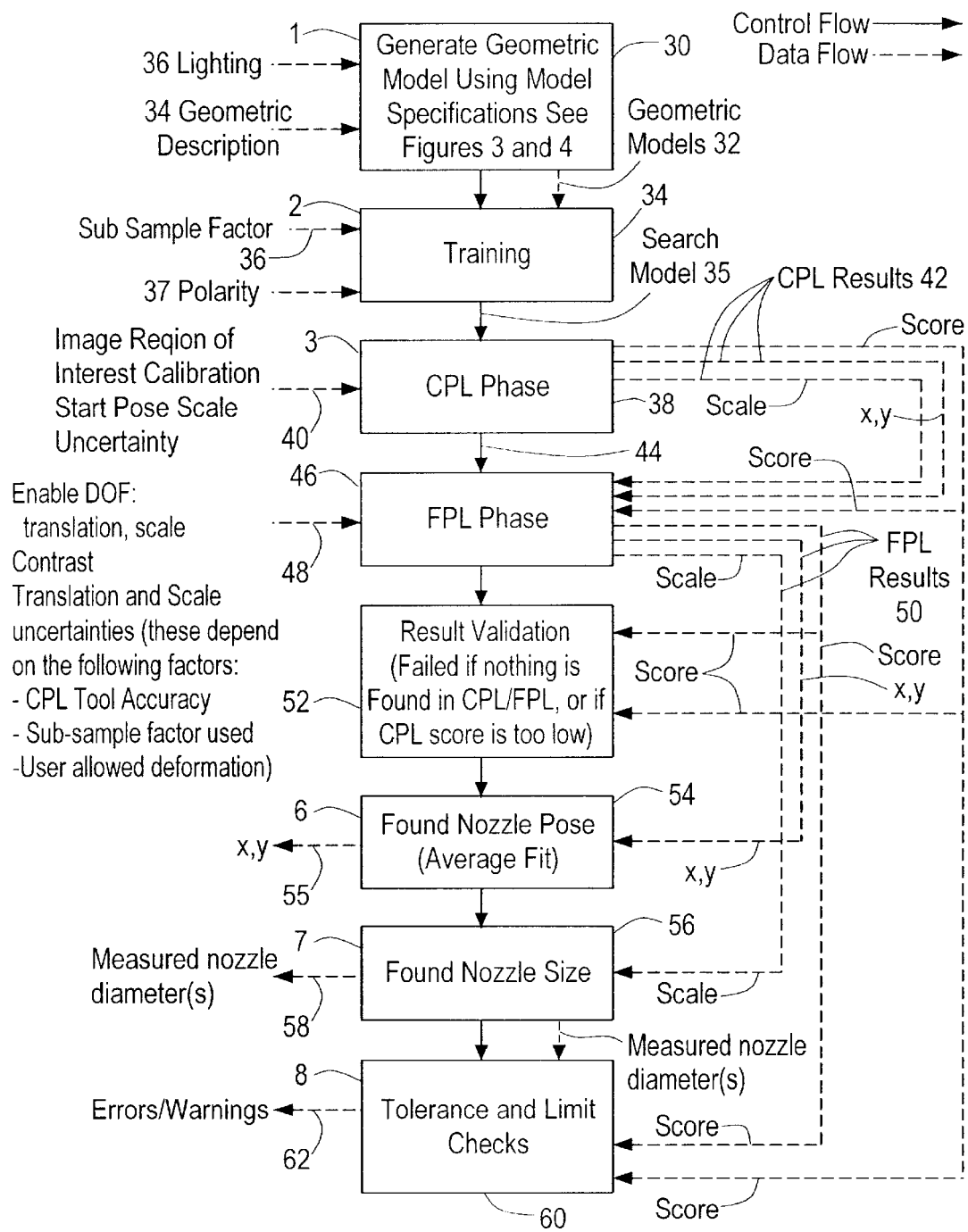
FIG. 5 is a control flow and data flow diagram illustrating an embodiment of the method of the invention.

With reference to FIG. 5, a preferred embodiment of the method of the invention is shown. Numbers in parentheses indicates steps of the method. Step (30) generates a geometric model 32, such as a Cognex Sub-Model Search Tool model, as shown in the upper-left of FIGS. 3 and 4, based upon the following specifications:

Geometric description 34—outer and/or inner diameter (see FIG. 1). Henceforth, we will refer to the circles correspond to these diameters as the outer and inner circles. Depending on whether one or two diameters are specified, the search tool searches for a circular shape or a ring in the image, respectively; and Lighting 36—front light, back light, or don't care (see FIG. 2). If 'back light' is specified, then only the outer diameter of the nozzle is used by the tool.

In step (34), image search models 35 (indicated in the table on the right side of FIGS. 3 and 4) are created using the geometric models 32 provided by step (30). In particular, coarse search models, such as PatQuick models, based on the entire nozzle description as a single model (ie. a "ring" structure if both diameters are specified) are provided for use in a subsequent coarse search step, such as the CPL step (38). CPL model training also takes as inputs the sub-sample factor 36, and a polarity setting 37 based on lighting status (back-lit or front-lit), as illustrated in FIGS. 2A and 2B.

Among the search models 35 provided by step (34) are fine search models, such as PatMax models, based on sub-models of the model of the nozzle, for use in a subsequent fine search step, such as the FPL step (44). Here, the inner and outer circles of the nozzle are represented as independent sub-models. This search strategy allows a more accurate assessment of the nozzle size, specially when the actual scale factors are different for the inner and outer circles of the nozzle.

For a front-lit nozzle where both diameters are specified, two circular sub-models are trained using the diameters. In Cognex Sub-Model Search Tool terminology, each sub-model is a closed two-vertex polygon that spans 180 degrees. The two sub-models are set to opposite directions due to the opposing polarities—the inner circle is always dark and the area between the two circles is bright. Since the two circles are concentric, the reference points of their corresponding sub-models almost coincide. As a result, a specialized version of the Cognex Sub-Model Search Tool fitter is invoked (54) that uses averaging, as described further below, to determine the final fine position of the nozzle.

For a backlit nozzle, only the outer diameter is used, even if both diameters were specified. In this case, there is only one sub-model. This sub-model is created the same way as the submodel that corresponds to the inner circle in the frontlit case that employs two sub-models.

Sub-sample factor 36 is computed prior to the model training step 34. The user can specify the sub-sample factor 36 manually. The sub-sample factor 36 can also be computed using an algorithm (e.g., as described below) based on calibration and model size. Note that a high sub-sample factor allows the method of the invention to run faster. However, the method may fail to find the nozzle if an image is over sub-sampled.

One way to compute the sub-sample factor is to the sub-sample routine described in the co-pending patent application entitled "A Constraint-satisfying Sub-sampler", assigned to Cognex Corporation, can be used to compute the desired sub-sample factor.

The resulting sub-sample factor must be selected so as not to sub-sample away important fine features of the image search model.

The thickness of the nozzle, i.e., the distance between the inner and outer circles, must be at least 2 pixels after sub-sampling. This is to prevent a thin "ring" from being subsampled away in an image. If the sub-sample routine returns a factor that violates this rule, the Cognex Sub-Model Search Tool will override the result using the following equation:

$$\text{subSampleFactor} = \text{ceil}(\text{minExpectedScale}/(\text{pixelSize}*2.0))$$

where minExpectedScale is the lower limit of user specified scale uncertainty, and where pixelSize comes from calibration. It specifies the ratio of the number of client space units to one image pixel.

The method of the invention employs a sub-model-based search tool, such as the Cognex Sub-Model Search (or locator) Tool as the underlying search engine. Therefore, the model training process involves creating a Cognex Sub-Model Search Tool model, or its equivalent, in a way that is suitable for nozzle location using the specifications listed above.

At runtime, the method of the invention invokes a sub-model-based search engine, such as the Cognex Sub-Model Search Tool, using the trained model. The results returned from the Cognex Sub-Model Search Tool are then interpreted, and the final results of the method (position of the nozzle 55, diameter(s) of the nozzle 58, and errors/warnings 62) results are derived therefrom, as will be explained below.

Inputs 40 and 48 to the nozzle location process:

Image—a digital image which contains an image of the nozzle to be located.

Calibration—specifys the client space to image space transformation.

Start pose—the expected X, Y position and scale of the nozzle in physical space.

Scale uncertainty—specifys the upper and lower limits on scale uncertainty.

Contrast—specifys the minimum gray scale difference of an edge pixel.

Region of interest in the image—this is the translation uncertainty.

Results returned by a preferred embodiment of the method of the invention:

X and Y position in physical space. This position is measured with reference to the nozzle center.

Measured inner and outer diameters in physical units.

Status of nozzle finding (eg., any error or warning issued by the nozzle location process, such as "exceeds tolerance", or "not found")

Time taken to locate the nozzle, in milliseconds, for example.

Preferably, the method invokes the Cognex Sub-Model Search Tool in a way that is suitable for nozzle location by using the trained model and specifications listed above.

The coarse search step CPL (38) returns one result, i.e., a coarse position 44 of the nozzle using a model of the entire nozzle. The start position and scale uncertainty specifications are included in the inputs 40 to this step (38). The angular uncertainty to the CPL step (38) is set to zero because a circular nozzle is rotationally invariant. The coarse location 44 of the nozzle provided by step (38) is then refined by the FPL step (46). The FPL step returns more accurate translation and scale information per sub-model (using a different sub-model for the inner and outer circles). Contrast is an input to the FPL step (44). The FPL final fit 55 of sub-model results is found by averaging in step (54), for example.

An error/warning message 62, such as "not found", is provided at step (60) if any one or more of these conditions occur:

The CPL step (38) failed to find a result.

The CPL score of the CPL results 42 is below a set threshold (currently set to 0.3, for example).

The FPL step (46) failed to locate at least one sub-model. An FPL sub-model result 50 is considered valid only if its coverage score is above a set threshold (currently set to 0.5, for example).

If both sub-model results are valid, the X and Y position is computed as follow:

X=(subModel[0].x+subModel[1].x)/2.0

Y=(subModel[0].y+subModel[1].y)/2.0

Otherwise, if only one sub-model result is valid, the position of the sub-model result for that sub-model is returned.

For each valid result 50 from the FPL search step (46), a measured diameter is computed at step (56) as follow:

measuredOuterDiameter=subModel[0].scale * outerDiameterInGeometricDescription measuredInnerDiameter=subModel[1].scale* innerDiameterInGeometricDescription A tolerance check is then performed at step (60) on this measured diameter. If the measured diameter exceeded its specified tolerance, an error 62 is flaged in the status field of the tool results to indicate this at step (60).

Finally, also at step (60), a warning is set in the tool results to alert the user of possible problem if either the CPL score of the CPL results 42 is below a set threshold (currently set to 0.4, for example), or the two sub-model positions returned by the FPL step (46) differ over 2 pixels in either the X or Y dimension.

Other modifications and implementations will occur to those skilled in the art without departing from the spirit and the scope of the invention as claimed. Accordingly, the above description is not intended to limit the invention except as indicated in the following claims.

What is claimed is:

1. A method for finding an image of an object having a concentric profile, the concentric profile having an inner profile and an outer profile, the inner profile being in concentric relationship with the outer profile, the method including:

creating a single model of the object using the inner profile and the outer profile;

creating a compound model of the object having an inner sub-model based on the inner profile, and an outer sub-model based on the outer profile;

in a coarse search phase, searching for the object using the single model to provide coarse location information;

in a fine search phase, searching for the object using the coarse location information and the compound model to provide fine object location and object scale information.

2. The method of claim 1, wherein the fine object scale information includes: an inner profile diameter and an outer profile diameter.

3. The method of claim 1, wherein each sub-model of the compound model is a closed two-vertex curvilinear shape that spans 180 degrees.

4. The method of claim 1, wherein each sub-model includes information representing polarity.

5. A method for finding an image of an object having a concentric profile, the concentric profile having a plurality of constituent profiles, the profiles being in concentric relationship with each other, the method including:

creating a single model of the object using the plurality of constituent profiles;

creating a compound model of the object having a sub-model for each profile of the plurality of constitutent profiles;

in a coarse search phase, searching for the object using the single model to provide coarse location information;

in a fine search phase, searching for the object using the coarse location information and the compound model to provide fine object location and object scale information.

6. The method of claim 5, wherein each of the profiles of the plurality of constituent profiles scales independently in the fine search phase.

* * * * *